L. GREENWALD.
VULCANIZING APPARATUS.
APPLICATION FILED MAY 11, 1920.

1,409,095.

Patented Mar. 7, 1922.

INVENTOR
Lemon Greenwald
BY G. G. Ely
ATTORNEY

UNITED STATES PATENT OFFICE.

LEMON GREENWALD, OF AKRON, OHIO, ASSIGNOR TO THE FIRESTONE TIRE AND RUBBER COMPANY, OF AKRON, OHIO, A CORPORATION OF OHIO.

VULCANIZING APPARATUS.

1,409,095.

Specification of Letters Patent. Patented Mar. 7, 1922.

Application filed May 11, 1920. Serial No. 380,443.

*To all whom it may concern:*

Be it known that I, LEMON GREENWALD, a citizen of the United States, residing at Akron, in the county of Summit and State of Ohio, have invented certain new and useful Improvements in Vulcanizing Apparatus, of which the following is a specification.

My invention relates to vulcanizers and refers particularly, although not exclusively, to vulcanizers for retreading and repairing the casings of automobile tires.

In an apparatus of this type it is customary to retread a tire in equal sections, as one-third of the circumference, in which case it is common to make the mold sections a little longer than one-third of the circumferential measurement so that the sections will over-lap one another at their junctions. This is essential in order to vulcanize the entire tread with an even number of sections, because it is impossible to exactly match one section with another, as the tires often vary in diameter on account of being worn down to a greater or less extent. Obviously, it can be seen that the overlapped portions will receive a double cure, which makes those portions hard or inelastic and discolored, thereby rendering them less durable than the other parts of the tread.

It is an object of this invention to provide a mold that may be adjusted to correspond with an even section, such as one-fourth, of the tread surface of the tire to be retreaded.

For making sectional repairs, it is the practice to use a shorter mold which is unsuited for retreading work, thereby making a double equipment necessary for the repair of tires.

An object of this invention is to provide a mold of the character described, in which retreading may be accomplished in a plurality of sections, but without submitting any portion of the tread to over curing, and which mold will be suitable for both retreading and sectional repair work. This is an immense advantage as it does away with the double equipment now used.

A further object of this invention is the provision of a means at the extremities of the mold cavity whereby the heat of vulcanizing, is reduced to approximately one-half that used in the mold, the intent of this being to impart a full cure to the overlap.

Another object is to provide a means at the ends of the mold bed that may be varied in size to accommodate approximately one-fourth of the tread surface of the tire.

A still further object is to provide a mold that, when used in curing a tire of a large size, may be quickly cooled between the successive curings. This being useful in producing what is known as a "raise cure," i. e. one in which the tire is placed in a cool mold and then heat is turned on gradually. If the mold were hot at the time of inserting the tire, the tread portion would be cured too rapidly and by the time the rubber at the inner edge of the tire was properly cured, the tread would be overvulcanized.

The above and other objects will more fully appear from the following description and will be especially pointed out in the annexed claims.

Figure 1:
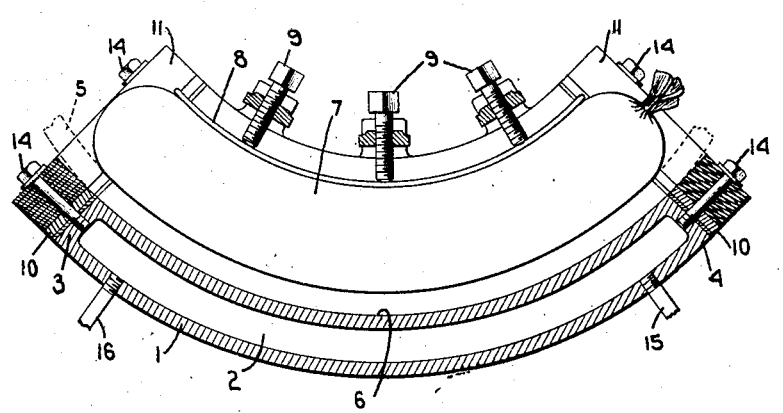
Fig. 1 is a sectional view through a mold embodying the preferred form of my invention.
Figure 2:
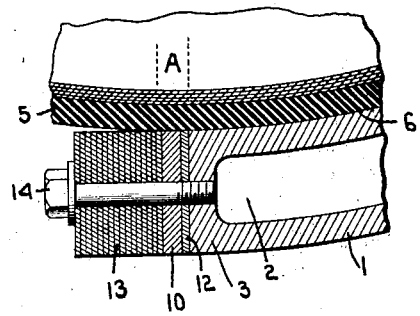
Fig. 2 is an enlarged fragmentary view thereof.
Figure 3:
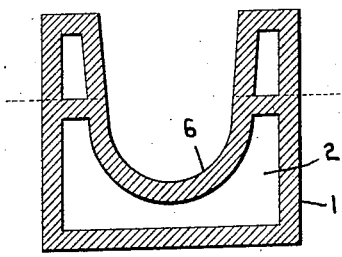
Fig. 3 is a transverse section through the mold showing in dotted lines the height of the usual retreading mold.

The mold illustrated in the drawings consists of a segmental mold, or mold bed, 1, of the type generally used in repairing, but also being adapted by means of my invention for retreading, surrounded by a steam chamber 2, and having ends 3 and 4. A section of a tire is shown at 5. The tread surface of the tire carcass is pressed against the mold concavity 6 by the usual sand bag 7, when the mold is used for retreading, or any other suitable means, which is acted upon by the pressure distributing bar 8 and the adjustable screws 9. In the repair of tires the expansible core and bead molds are used in place of the sand bag described above.

To retread a tire, it is the practice to cure a single section of it at one time in a mold of the type described above and to advance the tire by degrees until the entire circumference is cured. The tire is lapped at the junction of each section and, consequently, there are portions in the tread that are inferior and less desirable than the rest of the tread. The improved mold is made approximately of a length that will be an even section of the entire periphery of the tire, such as one-fourth of a circle, a proportion which is suitable for both retread and repair work.

By producing a mold that can be used for both retreading and repairing, only half of the equipment now used is necessary.

I successfully overcome the undesirable feature of overcuring the lapped portion of a tire with my invention. At each end of the mold I fasten a metallic block or plate 10 which is formed with an aperture 11 corresponding to the concavity 6 of the mold to allow for the passage of the tire. The plate 10 is made of iron or some other heat conducting material so as to transfer a certain predetermined amount of heat to the overlap portion of the tread. It has been found that a heat equal to about one-half that used in the mold is the best proportionate amount to take care of any overlap satisfactorily, the overlap, shown in the drawings at "A," getting a half cure at one time and receiving the second half of the cure as the next section is advanced in the mold.

The blocks or plates 10 are easily removed from the mold and other plates of greater or less thickness may be substituted to form a mold that is exactly a correct proportion of the individual tire to be retreaded.

A layer of asbestos 12 may be placed between the plate 10 and the end of the mold to reduce or correctly proportion the quantity of heat conducted to the plate 10. A block of non-heat conducting material 13, such as laminated or molded asbestos, is placed outside the plate 10 to prevent the tread from bulging over the end of the plate and forming a porous section, which results from the lack of pressure on the rubber at that point, or a ridge or mold mark on the tread surface. Parts 10, 12, and 13 are secured to the ends of the molds by screws 14.

In vulcanizing tires of a large size, it is customary to cure the rubber in the tread with a rising heat. This gives the tire a chance to become thoroughly heated throughout the entire thickness before vulcanization sets in. For the purpose of quickly cooling the mold between each cure, the mold is tapped with an inlet pipe 15 through which water is introduced. An outlet 16 is used to draw this fluid from the mold.

It will be obvious that in the employment of my improved mold it is possible to produce a better retread, which has been cured equally at all points on the tread surface.

The above description has been given for clearness of understanding only and no unnecessary limitation should be understood therefrom, many changes in forms and construction may be made without departing from the spirit of the invention within the scope of the appended claims.

I claim:

1. In an apparatus of the class described, the combination of an arcuate vulcanizing bed, means for heating said bed, and means at each end of the mold for conducting a predetermined amount of heat from the mold so that the portion of the tire over the end of the mold will receive a semi-cure.

2. In an apparatus of the character described, the combination of an arcuate vulcanizing bed, means for heating said bed, a metallic plate at each end of said mold bed, and insulating means between the plates and the ends of the bed adapted to proportion the amount of heat transferred from the bed to the plates so that that portion of the tire over the insulating means will receive a semi-cure.

3. Tire vulcanizing apparatus comprising an arcuate vulcanizing mold, heat insulating strips on the ends of said mold, and a heat conducting plate over each said strip.

4. Tire vulcanizing apparatus comprising an arcuate vulcanizing mold, heat insulating strips on the ends of said mold, a heat conducting plate over each said strip, and a non-conducting block on each said plate.

5. A tire vulcanizing repair and retreading mold extending over substantially 90° of the circumference of the tire, and means at the ends of said mold to conduct sufficient heat from the mold to partially vulcanize the portions of the tire thereover.

6. A tire vulcanizing mold comprising an arcuate heated section and means at the ends of said sections to sustain the adjacent surfaces of the tire and conduct enough heat from the main mold to partially vulcanize the said surfaces.

LEMON GREENWALD.